United States Patent
Fasanella et al.

[19]

[11] Patent Number: 6,021,243
[45] Date of Patent: Feb. 1, 2000

[54] LOW-COST PLANAR STAR-COUPLING STRUCTURE FOR LARGE-CORE POLYMER OPTICAL FIBERS

[75] Inventors: Kenneth W. Fasanella, Skillman; Yao Li, Monmouth Junction; Ting Wang, Princeton, all of N.J.

[73] Assignee: NEC Research Institute, Inc., Princeton, N.J.

[21] Appl. No.: 09/027,103

[22] Filed: Feb. 20, 1998

Related U.S. Application Data

[60] Provisional application No. 60/061,133, Oct. 6, 1997.

[51] Int. Cl.$^7$ ....................................................... G02B 6/26
[52] U.S. Cl. .................................. 385/46; 385/31; 385/39
[58] Field of Search .......................... 385/15, 39, 42–46, 385/49–52, 31

[56] References Cited

U.S. PATENT DOCUMENTS

| | | | |
|---|---|---|---|
| 4,904,042 | 2/1990 | Dragone | 350/96.16 |
| 5,400,423 | 3/1995 | Chun et al. | 385/46 |
| 5,771,324 | 6/1998 | Hargis | 385/43 |

OTHER PUBLICATIONS

Y. Koike, "High–Bandwidth Graded–Index Polymer Optical Fiber", IEEE Journal of Lightwave Technology, vol. 13, pp. 1475–1489, Jul. 1995.

S. Yamazaki et al., "A 2.5 GB/s 100m GRIN Plastic Optical Fiber Data Link at 650 nm Wavelength," Graded Index POF, (Information Gatekeepers, Boston, 1996), pp. 98–101, No month given.

T. Ishgure et al., "Large–Core High–Bandwidth Polymer Optical Fiber and Its Application." Technical Digest Of CLEO/Europe 94, Paper CThD5.

Y. Li et al., "Distribution of Light and Optical Signals Using Embedded Mirrors Inside Polymer Optical Fibers," IEEE Photon. Technol. Lett., vol. 8, No. 10, pp. 1352–1354, Oct. 1996.

Y. Li et al., "4×16 Polymer Fiber Optical Array Couplers," IEEE Photon. Technol. Lett., vol. 8, No. 12, pp. 1650–1652, Dec. 1996.

K.A. Williams et al., "A Media–Access Protocol for Time– and Wavelength–Division Multiplexed Passive Star Networks," IEEE J. Selected Areas in Comm., vol. 11, No. 4, pp. 560–567, May 1993.

A. Robinson et al., "Performance of an Optical Backplane Bus for Switch Interconnection," in IEE Proc. Optoelectronics, vol. 143, No. 4, pp. 237–243, Aug. 1996.

C. Zhao et al., "Hybrid Optoelectronic Backplane Bus for Multiprocessor–based Computing Systems," Proc. MPPOI '96, Maui, HW Oct. 27–29, 1996 (IEEE Computer Society Press), pp. 313–320, No month given.

C. Dragone et al., "Efficient Multichannel Integration Optics Star Couplers on Silicon," IEEE Photon. Tech. Lett., vol. 1, No. 8, pp. 241–244, Aug. 1989.

K.Okamoto et al., "Fabrication of Large Scae Integrated–Optical N×N Star Couplers," IEEE Photon. Tech. Lett., vol.4, No. 9, pp. 1032–1035, Sep. 1992.

K. Okamoto et al., "Fabrication of Wavelength–Insensitve 8×8 Star Coupler," IEEE Photon. Tech. Lett., vol. 4, No. 1, pp. 61–63, Jan. 1992.

*Primary Examiner*—John D. Lee
*Assistant Examiner*—Juliana K. Kang
*Attorney, Agent, or Firm*—Philip J. Feig; Andrew G. Isztwan

[57] ABSTRACT

A low-cost star-coupler assembly primarily for use in optical data networks is fabricated from three modular components. The first component is a support plate having at least two sets of grooves into which polymer optical fibers may be placed and a central aperture. The second component is a waveguide plate which is designed to fit in the aperture. The third component is a cover plate having alignment means for aligning the components in fixed relationship and for holding polymer optical fibers in the grooves securely in place. The coupling structure is most useful with large-core polymer optical fibers. The modular design facilitates replacement of fibers. The components may be fabricated by injection molding thereby reducing the cost.

52 Claims, 4 Drawing Sheets

LOW-COST PLANAR STAR-COUPLING STRUCTURE FOR LARGE-CORE POLYMER OPTICAL FIBERS

CROSS REFERENCE TO RELATED APPLICATIONS

This application claims the benefit of U.S. Provisional Application No. 60/061,133, filed Oct. 6, 1997.

FIELD OF THE INVENTION

The present invention relates to planar star-couplers useful in high-speed, multiple access optical data networks, and specifically to a modular, low-cost coupler primarily for use with large-core polymer optical fibers.

BACKGROUND OF THE INVENTION

Star couplers are used in high-speed, multiple access optical networks since they evenly distribute an input signal among many receivers and makes possible the interconnection between them. A star coupler comprises two arrays of channel waveguides (an input array and an output array) separated by a slab waveguide. The output power from any of N fibers connected to the input array is radiated in the slab and received efficiently by the output array of fibers.

The recent increase of interest in polymer optical fibers (POF) was primarily driven by the belief that large core polymer optical fibers may become a cost-effective short distance interconnect solution for many data communication applications as described, for example, in an article by Y. Koike et al entitled "High-Bandwidth Graded-Index Polymer Optical Fiber" in IEEE Journal of Lightwave Technology, Vol. 13, pp. 1475–1489, 1995. It has been shown that material, production, as well as connection costs associated with polymer optical fibers are appreciably lower than those of glass fibers. Moreover, when polymer optical fibers are more widely accepted, these costs can be further reduced and become comparable to the costs of copper transmission lines of similar bandwidth. While research on finding low-loss polymer optical fibers materials and low-cost production methods is actively being pursued as shown, for instance, in an article by S. Yamazaki et al entitled "A 2.5 GB/s 100 m GRIN Plastic Optical Fiber Data Link at 650 nm Wavelength", in Graded Index POF, (Information Gatekeepers, Boston, 1996), pp. 98–101 and in an article by T. Ishgure et al entitled "Large-Core High-Bandwidth Polymer Optical Fiber and Its Applications", in Technical Digest of CLEO/Europe '94, paper CThD5, attention has also been drawn to low-cost connection schemes. Large core size, and high material flexibility provide many opportunities to decrease coupling and connection costs for polymer optical fibers. Etched-mirror-based side-couplings have been used to couple light in or out of polymer optical fibers cost-effectively. See for example, an article by Y. Li et al entitled "Distribution of Light and Optical Signals Using Embedded Mirrors Inside Polymer Optical Fibers" in Photon Technol. Lett, vol. 8, pp. 1352–1354, 1996 and an article by Y. Li et al entitled "4×16 Polymer Fiber Optical Array Couplers", in IEEE Photon. Technol. Lett., vol. 8, pp. 1651–1652, 1996.

SUMMARY OF THE INVENTION

The present invention concerns a low-cost polymer optical fiber star-coupling structure that can be assembled in the absence of a precision environment. In addition, the use of the resulting plug-and-play fiber optic component requires minimum training.

A star-coupler is an important fiber optic component because it allows multiple signal broadcasts. It can be widely used in both time-division or wavelength-division based networks, such as optical buses. Such arrangements are described in an article by K. A. Williams et al entitled "A Media-Access Protocol for Time- and Wavelength-Division Multiplexed Passive Star Networks", in IEEE J. Selected Areas in Comm., vol 11, pp. 560–567, 1993; and in an article by A. Robinson et al entitled "Performance of an Optical Backplane Bus for Switch Interconnection", in IEE Proc. Optoelectronics, vol. 143, pp. 237–243, 1996; and in an article by C. Zhao et al entitled "Hybrid Optoelectronic Backplane Bus for Multiprocessor-based Computing Systems", Proc. MPPOI'96, Maui, HW, Oct. 27–29, 1996 (IEEE Computer Society Press), pp. 313–320.

One method of fabricating a star-coupler uses a planar geometry where a one-dimensional (1D) flat cavity is sandwiched between an input array and an output array of waveguides. Such construction is described in an article by C. Dragone et al entitled "Efficient Multichannel Integration Optics Star Couplers on Silicon", IEEE Photon. Tech. Lett., vol. 1, pp. 241–244, 1989; in an article by K. Okamoto et al entitled "Fabrication of Large Scae Integrated-Optical N×N Star Couplers", IEEE Photon. Tech. Lett., vol. 4, pp. 1032–1035, 1992; and in an article by K. Okamoto et al entitled "Fabrication of Wavelength-Insensitive 8×8 Star Coupler", in IEEE Photon. Tech. Lett., vol. 4, pp. 61–63, 1992. Such planar star-couplers for single-mode and multi-mode glass fibers are commercially available. Beside the high fabrication cost of such couplers, users must pay an additional cost of interfacing such couplers with conventional fibers.

In accordance with the teachings of the present invention, there is provided a planar POF star-coupler which uses cost-effective injection-molding fabrication technology, and requires no additional fiber interfacing cost.

A principal object of the present invention is therefore, the provision of a low-cost modular star-coupler for large-core polymer optical fiber interconnects.

Other objects of the present invention will become more clearly apparent when the following description is read in conjunction with the accompany drawings.

DETAILED DESCRIPTION

Figure 1:
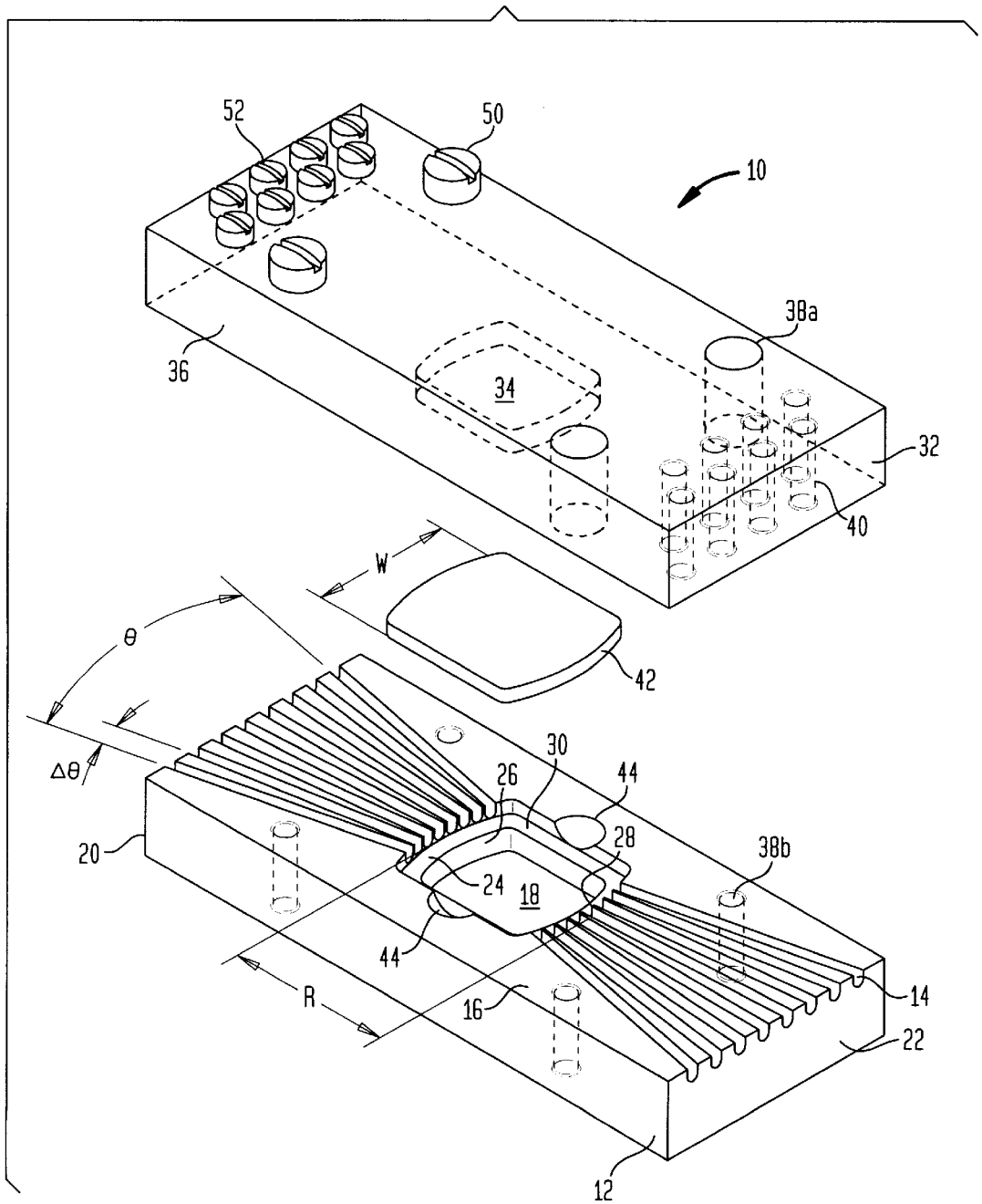
FIG. 1 is a schematic drawing of a three-plate modular polymer optical fiber planar star-coupler.

Referring now to the figures and to FIG. 1 in particular, there is shown a schematic diagram of a proposed N×N POF planar star-coupler 10, where N×N is 8×8. The coupler comprises three portions, each fabricated using polymer materials, and preferably injection molded. The top surface 16 of bottom portion or plate 12 has a pair of sets of N symmetric U-shaped grooves 14 in its top surface 16 extending from a centrally located air pocket 18 to respective distal ends 20, 22 of the bottom plate 12. The grooves are preferably molded into the plate, but they can be made using a standard ball endmill milling cutter. The radial dimension of the grooves 14 depends on the diameter of the polymer optical fibers to be used with the coupler. The angular spacing between any two adjacent grooves is denoted by $\Delta\theta$ so that the overall angular span of the N grooves, $\theta$, is $(N-1)\Delta\theta$. Typically $\Delta\theta$ is in the range between 0° and $2\sin^{-1}(NA)$ where NA is the numerical aperture of the fibers being used. The grooves may be parallel to one another, instead of radial, as would be the case when $\Delta\theta=0°$. All N grooves in a set of grooves are adjacent to each other at the air pocket 18 without additional spacing between them so that the width W of the air pocket 18 is kept to a minimum. Each fiber and air pocket interface 24 has a round curvature R and a confocal geometry is used to determine the center-to-center distance of the two oppositely curved surfaces 26, 28 of air pocket liner 30. The air pocket liner 30 has two steps in the vertical dimension as shown in the drawing with the bottom portion of the liner being slightly smaller than the top portion of the liner so that a waveguide plate placed in the opening 18 will be supported by the bottom portion of the liner.

The top plate 32 of the star-coupler also has a corresponding air pocket 34 located on the bottom surface 36 of the top plate 32. The air pocket 34 has the same dimensions as the bottom portion of the liner 30 in bottom plate 12. Four alignment screw holes 38a located in the top plate and four threaded alignment holes 38b located in the bottom plate are aligned so that holes in one plate are aligned with corresponding holes in the other plate. The alignment is such that a screw shaft passing through hole 38a in the top plate is securely fastened in threaded hole 38b in the bottom plate. In addition, N fiber fixing threaded screw holes 40, located near each end of the top plate relative to the position of the grooves 14 on the surface of plate 22, are used with alignment screws to stabilize the interfacing fibers to be disposed in the grooves. The third component of the coupler 10 is a flat polymer waveguide plate 42 having substantially the same dimensions as that of the top portion of the liner 30 in the bottom plate 12. The plate 42 serves as the necessary planar waveguide linking the input and output polymer optical fibers. The plate can be inserted into the air pocket 18 with both its top and bottom surfaces suspended in air to guarantee wave guiding. To make sure the waveguide plate can be removed after it is disposed into the air pocket, two notches 44, one on each side of the air pocket 18 are recessed in the top surface 16 of bottom plate 12 adjacent to the air pocket as shown. In order to reduce access power loss, the side walls of the plate 42 may be coated with a metallic film. The waveguide plate 42 preferably is a polymer, such as PMMA, Hesalite or Zeronex. Typical metal films are gold, silver or aluminum. The waveguide plate preferably is selected to be of a material whose refractive index equals or approximately equals that of the core of the polymer optical fiber in order to optimize coupling of the light into and out of the plate 42. For example, for a PMMA fiber having a $\eta_{Core}=1.492$, the waveguide plate refractive index should be approximately the same. In order to achieve optimal coupling, the top plate 32 and bottom plate 12 should be fabricated from a material whose refractive index is equal to or larger than that of the core of the polymer optical fiber.

The plates may be fabricated from transparent, translucent or opaque materials.

In operation, the three plate star-coupler assembly is first assembled by fastening alignment screws 50 passing through alignment screw holes 38a in top plate 32 into the threaded screw holes 38b in bottom plate 22. Polished POFs with an index-matching gel placed on their tips are inserted into the grooves 14 on both sides of the coupler 10. The index matching gel matches the refractive indices of the fiber to that of the waveguide plate. Fiber fixing screws 52 are tightened in threaded fiber fixing screw holes 40 in order to assure stability of the fibers. In this way, repair and replacement of individual POFs is simple and speedy. A unique feature of the self-assembled POF star-coupler is that polymer optical fibers are directly introduced to the planar waveguide region without additional fiber-to-waveguide connections that are necessary in conventional glass fiber planar star-coupler components. A typical POF usually has a 970 $\mu$m core and a 15 $\mu$m cladding layer surround the core. The result is that when the fibers are placed in juxtaposition, light loss into the fiber cladding layer is minimum. In contrast, when a similar method is used with glass fibers which have a much thicker cladding layer, a significant power loss into the cladding layer occurs. Therefore, the described star- coupler is compatible for use with standard POFs.

EXAMPLES

Experimental samples of the described POF planar star-couplers were fabricated for interconnecting standard data communication polymer optical fibers of Polymethyl Methacrylate (PMMA) having a 1 mm diameter. Such PMMA fibers usually have a numerical aperture of approximately NA=0.5, and an absorption-dependent loss of approximately 125 dB/km at a 650 nm transmission window. One major difference between a PMMA fiber and a glass fiber is that the PMMA fiber is heavily spectral dependent in the visible region. The 3 dB absorption bandwidth centered at 650 nm is only about 15 nm. Thus, only short distance interconnect applications are practical. For the purpose of demonstrating the invention, transparent acrylic (polymethyl methacrylate) plates were machined instead of injection-molded to form the top and bottom plates. The polymer waveguide plate used was a 1 mm thick scratch-resistance Hesalite plate. The most important parameters of the star-coupler are the channel separation angle $\Delta\theta$ and the length of the air pocket 18 or planar waveguide R. Because of the confocal design, it can be shown that $$R=Nd/2 \sin^{-1}(\beta NA) \qquad (1)$$

where d is the diameter of the polymer optical fibers, and $\beta$ is a fill parameter which is defined as the portion a collectable angular span of the receiving fiber array of the entire numerical aperture, $0 \leq \beta \leq 1$. Based on Eq.(1), and for N=8, NA=0.5, four different fill parameters: 0.8, 0.5, 0.3, and 0.2 were used. Three samples of each configuration were machined for experiments. The resulting waveguide lengths were 9.7 mm, 15.8 mm, 26.4 mm, and 39.8 mm, respectively. Sidewalls of the waveguide plates were coated with aluminum. Index matching gel was used at all fiber and waveguide interfaces.

MEASUREMENTS

Power distribution and power loss measurements were performed for each set of parameters. Eight output fibers were inserted into the output ports of the star-coupler and securely fastened and stabilized. A common input fiber was used for the measurements. 5 mW, λ=650 nm power stabilized InGaP/InGaAlP multiple quantum-well semiconductor laser (TOLD 9421) was employed. The output power of a one meter long input POF was controlled to be 1 mW. Coupled power into each of the 8 output polymer optical fibers was measured for each input case. A typical set of measurement results using the star-coupler with β=0.5 is shown in Table 1.

TABLE 1

| | Output Channels | | | | | | | | | |
|---|---|---|---|---|---|---|---|---|---|---|
| | 1 | 2 | 3 | 4 | 5 | 6 | 7 | 8 | Σ | Δ(dB) |
| 1 | 30.4 | 49.7 | 83.8 | 101 | 96.6 | 81.2 | 49.3 | 32.5 | 524.5 | 5.2 |
| 2 | 31.2 | 56.3 | 79.5 | 102 | 95.5 | 80.7 | 47.7 | 33.5 | 526.4 | 5.1 |
| 3 | 30.2 | 46.3 | 78.5 | 93.2 | 105 | 98.7 | 50.2 | 32.4 | 534.5 | 5.4 |
| 4 | 32.3 | 50.1 | 76.3 | 91.2 | 107 | 88.2 | 47.3 | 31.7 | 524.1 | 5.3 |
| 5 | 32.3 | 46.5 | 89.7 | 110 | 90.3 | 73.5 | 48.2 | 32.7 | 523.2 | 5.3 |
| 6 | 31.6 | 49.7 | 97.6 | 107 | 92.8 | 80.1 | 44.9 | 29.8 | 533.5 | 5.5 |
| 7 | 32.5 | 51.6 | 79.5 | 96.4 | 104 | 78.3 | 48.2 | 30.1 | 520.6 | 5.4 |
| 8 | 31.5 | 44.3 | 83.4 | 97.2 | 105 | 79.8 | 47.2 | 29.6 | 518.0 | 5.5 |

All figures except those in the last column are in units of microwatts. The column under the symbol Σ indicates the power summation of all 8 output channels. The last column is the fluctuation measure in dB and is the result of dividing the minimum by the maximum power of the 8 channels. It should be observed that the overall efficiency of coupling is about 3 dB. The access loss of about 3 dB can be traced to the loss caused by the imperfect interface between the fibers and the waveguide and the loss caused by the coupling loss into the fiber cladding and into other unwanted regions. It was noted that careful polishing of the fiber tips can result in reduction of access loss of about 0.2–0.5 dB per connection. The last column of Table 1 shows the fluctuation data of the 8 channels. In this case, each channel suffers a fluctuation of 5.1–5.5 dB. In comparison to planar waveguide couplers for glass fibers, the low-cost POF coupler of the present invention has a larger access loss and a larger power splitting fluctuation. However, it must be noted that the resulting access loss includes the fiber to waveguide interface loss which is typically not included when considering glass star-couplers. The use of a much larger core size than that used in a single mode fiber can result in a substantial interface loss. For example, while fiber to fiber connection for single mode fibers usually introduces 0.1–0.2 dB loss, the same type of connection for large-core PMMA fibers typically introduces a 0.5–0.7 dB loss. The measured fluctuations were slightly smaller when the middle input channels were used to transmit power than when the channels on either side of the star-coupler were used.

Figure 2:
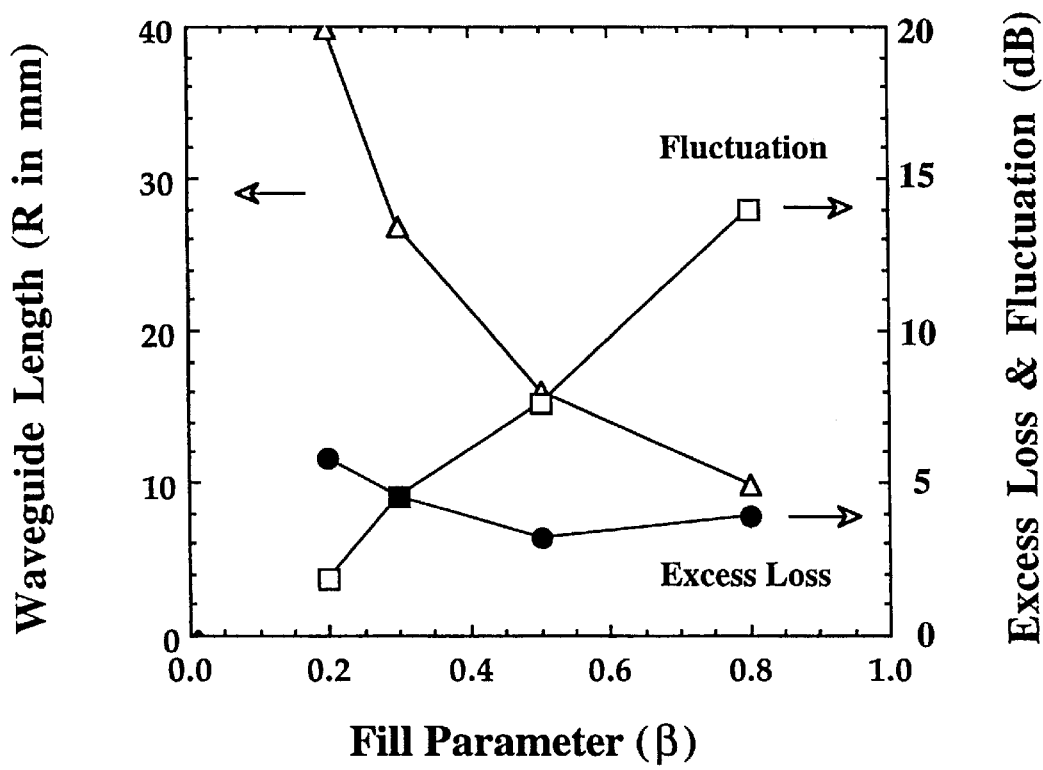
FIG. 2 is a graphical representation of waveguide length, measured overall excess power loss, and channel fluctuation versus the star-coupler fill parameter $\beta$.

Measurements were also performed for the three other star-coupler sets of different parameters. FIG. 2 graphically illustrates the overall measurement results of the four sets of parameters. The displayed three data sets are the longitudinal dimension of the waveguide R (in mm), the excess loss and the fluctuation (both in dB). It can be seen that as the fill parameter β becomes smaller, the waveguide length must be increased to maintain the level of access power loss. However, a smaller β results in less fluctuation among the 8 receiving channels (from about 14 dB to less than 2 dB). The access power loss changes somewhat less dramatically with β. A longer cavity star-coupler results in a larger loss. Thus, a trade-off must be made between the device compactness, power efficiency, and channel fluctuation tolerance.

In addition to the above measurements, measurements were also made of the back reflections of the four sample sets. The obtained results were independent of the waveguide parameters. The results, in general, depend on the quality of the termination and the interfaces. Typical back reflections from any channel are in the range of −20 dB to −26 dB. Also, no observable polarization related splitting ratio change occurred during our experiments.

Figure 3:
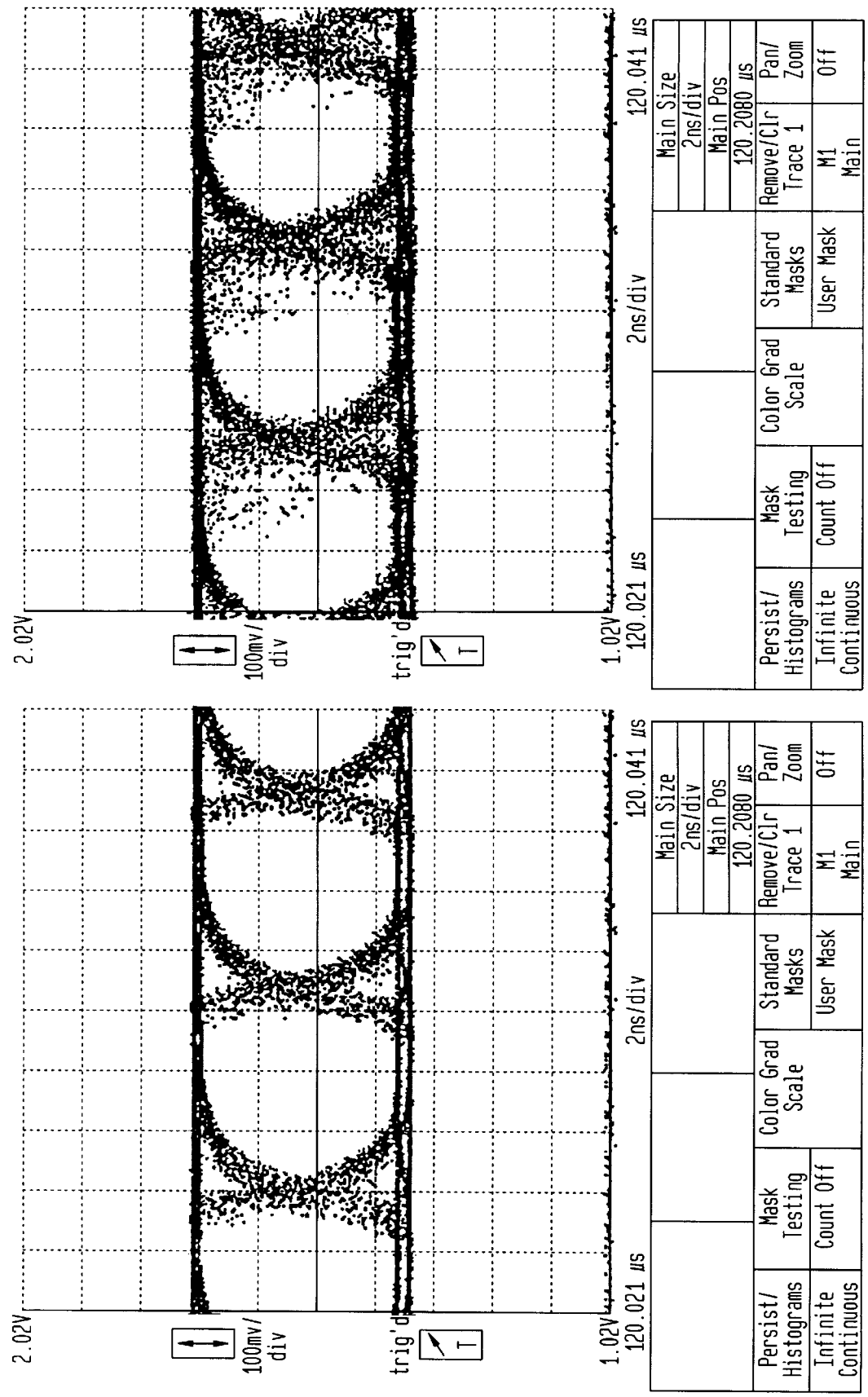
FIG. 3 are eye diagrams (2 ns/div) of 155 mbls data transmitted through the highest and lowest receiving power channels of the star-coupler.

FIG. 3 graphically illustrates results using a polymer star-coupler having a β=0.5. Using a LED/Si PIN based transceiver (NEC 2100) which has a performance of $10^{-10}$ bit-error-rate for transmitting 156 Mb/s data over 50 meters of standard PMMA fiber, two typical eye-diagrams are shown in FIG. 3. One diagram is for the largest power channel and the other diagram for the smallest power channel.

The present invention provides a low-cost, plug-and-play, all polymer star-coupler for POF networking applications. The modularly structured three-plate star-coupler can be mass-produced using injection molding technology. Studying the coupling efficiency, channel fluctuation and their relations to the coupler structure results in the conclusion that the use of a smaller fill parameter can result in small power coupling fluctuation among receiving channels. The smaller fiber parameter results in the overall dimension of the coupler being less compact and there being a larger access power loss. The coupler structure eliminates additional interfaces between waveguides and connection fibers. Moreover, the structure is suitable for POFs which have a thin cladding layer.

The primary advantage of the present invention resides in its use for low-end low-cost products where cost is more important than performance. The polymer coupler does not meet the performance of either the more expensive single-mode or multimode glass fiber couplers.

Figure 4:
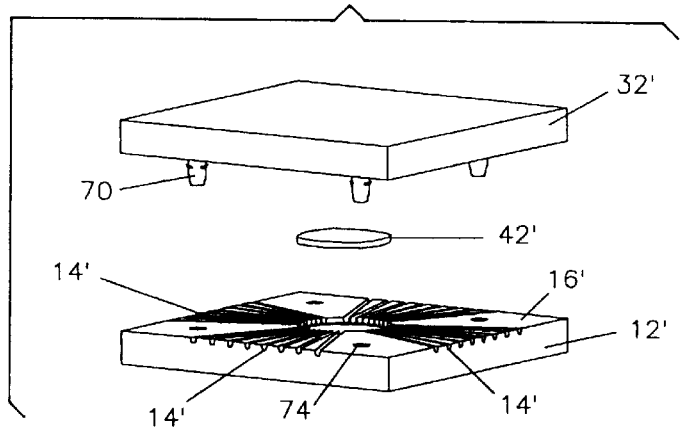
FIG. 4 is a schematic drawing of an alternative embodiment of a three-plate modular polymer optical fiber planar star-coupler.

In a variation of the above described star-coupler embodiment, it is possible to add additional grooves 14' as shown in FIG. 4 in the top surface 16' of the lower plate 12' which are in a direction orthogonal to the grooves 14 shown in FIG. 1. When polymer optical fibers are disposed in those grooves 14 and 14' and are optically coupled to the waveguide plate 42 light entering the waveguide plate may be coupled to fibers on the oppositely disposed end of the plate 42 or to the fibers at either or both sides of the plate 42.

In a further variation, light can be made to be reflected from the waveguide plate 42 to another fiber located at the same edge of the waveguide into which the light is being transmitted.

Figure 5:
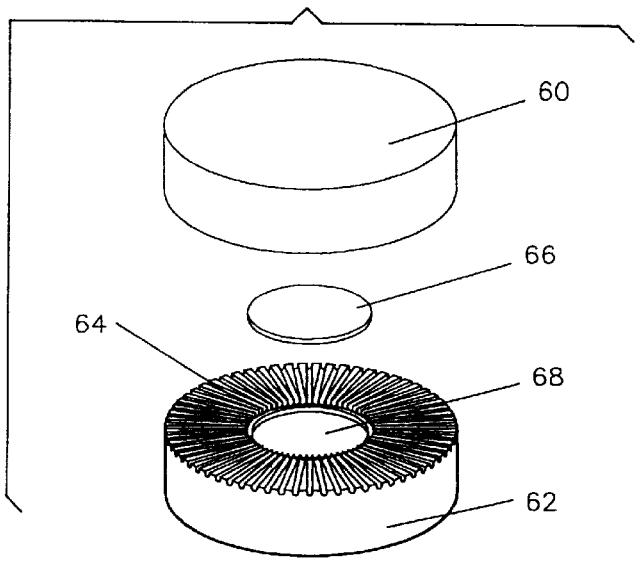
FIG. 5 is a schematic drawing of an embodiment of a three-plate modular polymer optical fiber circular planar star-coupler.

FIG. 5 shows a variation of the above described embodiments where the upper plate and the lower plate are replaced by disks 60 and 62, respectively. Radial grooves 64 are fabricated or molded into the surface of disk 62. The grooves 64 are separated from each other by an angle Δθ. A circular waveguide plate 66 is located in circular aperture 68 in disk 62. Polymer optical fibers are placed in the grooves 64 and then the disks 60 and 62 are compressed together by clamps (not shown) or other disk holding devices.

Light enters the waveguide plate 66 from one or more fibers located in grooves 64 and is transmitted to fibers located in other grooves 64.

In an alternative preferred embodiment of the invention, the alignment screws and fiber fixing screws are replaced by redesigning the plates with spring clips and corresponding receptacles, first to initially engage the plates to form grooves into which polymer optical fibers are placed and subsequently to lock the plates, waveguide plate and fibers together in a predetermined fixed relationship.

Figure 6:
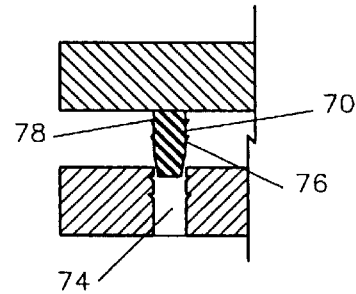
FIG. 6 is a sectional view of a preferred embodiment of an alignment mechanism for use in the present invention.

FIG. 6 shows another preferred arrangement for a two-step alignment of plates 12 and 32 shown in FIG. 1. Alignment screws 50, alignment screw holes 38a and treaded alignment holes 38b, as well as fiber fixing screws 52 and fiber fixing threaded screw holes 40 are eliminated from the coupler design. In their place a barbed locating pin 70 extends from the upper plate 32 and a corresponding socket or receptacle is located in lower plate 12 for receiving the pin 70 and securely aligning the plates 12 and 32 in the desired relationship as described above. The plates to which the pin and receptacle is located may be reversed.

In order to assemble the coupler, the plates 12 and 32 are urged together until the first barb 76 along pin 70 is engaged in socket 74. The plates are aligned but spaced apart a sufficient distance to enable polymer optical fibers to be placed into the grooves 14 in the surface 16 of the lower plate 12. After the fibers are in place, the plates 12 and 32 are urged together until the second barb 78 engages the socket 74 to securely retain the plates 12 and 32, waveguide plate 42 and fibers in proper alignment.

While there has been described and illustrated a low-cost star-coupler structure for large-core polymer optical fibers and several variations and modifications thereof, it will be apparent to those skilled in the art that further variations and modifications are possible without deviating from the broad teachings and spirit of the invention which shall be limited solely by the scope of the claims appended hereto.

What is claimed is:

1. A planar star coupler comprising:
   a first plate having a top surface with an aperture disposed therein;
   a first set of grooves disposed in the top surface of said first plate extending from said aperture to a first edge of the top surface;
   a second set of grooves disposed in the top surface of said first plate extending from said aperture to a second edge of the top surface;
   a removable waveguide plate dimensioned to fit into said aperture in said first plate;
   a second plate having an aperture located therein so that when said second plate is in juxtaposition with said first plate, said aperture in said first plate aligns with said aperture in said second plate; and
   means for removably aligning and securing said first plate, said waveguide plate and said second plate in alignment.

2. The planar star coupler of claim 1, wherein said means for removably aligning comprises screw holes through one of said plates and threaded screw holes embedded in said other plate, such that a screw through said screw holes is captured in said threaded screw hole.

3. The planar star coupler of claim 1, further comprising means disposed in said second plate opposite said grooves for enabling securement of fibers located in said grooves.

4. The planar star coupler of claim 3, wherein said means for enabling securement comprises a plurality of threaded holes disposed so that a screw through a threaded hole will secure a fiber located in an associated groove.

5. The planar star coupler of claim 1, wherein said first plate and said second plate are molded plastic.

6. The planar star coupler of claim 1, where said waveguide plate is molded polymer.

7. The planar star coupler of claim 1, where said waveguide plate has a metallic layer on its edges.

8. The planar star coupler of claim 1, wherein said top surface of said first plate includes means for facilitating removal of said removable waveguide plate.

9. The planar star coupler of claim 8, wherein said means for facilitating removal comprises at least one notch provided in said first plate adjacent to said aperture in said first plate.

10. The planar star coupler of claim 1, wherein adjacent grooves are separated by angular spacing Δθ, where $0° \leq \Delta\theta \leq \sin^{-1}(NA)$, where NA is the numerical aperture of fibers to be located in said grooves.

11. The planar star coupler of claim 1, wherein said means for aligning comprises spring clips and receptacles molded in said first plate and said second plate.

12. The planar star coupler of claim 1, wherein said means for aligning comprises a barbed pin and a mating receptacle.

13. The planar star coupler of claim 1, wherein said first plate and said second plate are disks, said aperture is circular, and said grooves extend radially from said aperture.

14. The planar star coupler of claim 1, wherein said first edge and said second edge are the same edge.

15. The planar star coupler of claim 1, wherein said aperture in said first plate and said aperture in said second plate are dimensioned to provide an air pocket, such that top and bottom surfaces of said waveguide plate are suspended in said air pocket.

16. The planar star coupler of claim 15, further comprising means for suspending said waveguide plate in said air pocket.

17. The planar star coupler of claim 16, wherein said means for suspending comprises an air pocket liner having two steps, such that the air pocket liner include a top portion and a bottom portion smaller in dimension than said top portion, whereby the waveguide plate is supported by said bottom portion of said air pocket liner and suspended in said air pocket.

18. An optical network of polymer optical fibers including a planar star coupler comprising:
   a first plate having a top surface with an aperture disposed therein;
   a first set of grooves disposed in the top surface of said first plate extending from said aperture to a first edge of the top surface;
   a second set of grooves disposed in the top surface of said first plate extending from the said aperture to a second edge of the top surface;
   a removable waveguide plate dimensioned to fit into said aperture in said first plate;
   a second plate having an aperture therein located so that when said second plate is in juxtaposition with said first plate, said aperture in said first plate aligns with said aperture in said second plate;

means for removably aligning and securing said first plate, said waveguide plate and said second plate in alignment;

a first set of input polymer optical fibers disposed in said first set of grooves;

a second set of output polymer fibers disposed in said second set of grooves; and securing means for securing said first and said second set of polymer fibers in respective said first and said second set of grooves.

19. The optical network of claim 18, wherein said first plate and second plate are molded plastic.

20. The optical network of claim 18, wherein said waveguide plate is molded polymer.

21. The optical network of claim 18, wherein adjacent grooves are separated by angular spacing, $\Delta\theta$, where $0 \leq \Delta\theta \leq \sin^{-1}$ (NA), where NA is the numerical aperture of said fibers.

22. The optical network of claim 18, wherein said first edge and said second edge are the same edge.

23. The optical network of claim 18, wherein said first plate and said second plate are disks, said aperture is circular, and grooves extend radially from said aperture to the circumference of said disk.

24. The optical network of claim 18, wherein said securing means comprises a clamp.

25. The optical network of claim 18, wherein said aperture in said first plate and said aperture in said second plate are dimensioned to provide an air pocket, such that top and bottom surfaces of said waveguide plate are suspended in said air pocket.

26. The optical network of claim 25, further comprising means for suspending said waveguide plate in said air pocket.

27. The optical network of claim 26, wherein said means for suspending comprises an air pocket liner having two steps, such that the air pocket liner include a top portion and a bottom portion smaller in dimension than said top portion, whereby the waveguide plate is supported by said bottom portion of said air pocket liner and suspended in said air pocket.

28. A planar star coupler comprising:

a first plate having a top surface with an aperture disposed therein;

a first set of grooves disposed in the top surface of said first plate extending from said aperture to a first edge of the top surface;

a second set of grooves disposed in the top surface of said first plate extending from said aperture to a second edge of the top surface;

a waveguide plate dimensioned to fit into said aperture in said first plate, said waveguide plate having a top surface and a bottom surface;

a second plate having an aperture located therein so that when said second plate is in juxtaposition with said first plate, said aperture in said first plate aligns with said aperture in said second plate to form an air pocket, such that top and bottom surfaces of said waveguide plate are suspended in said air pocket; and means for aligning and securing said first plate, said waveguide plate and said second plate in alignment.

29. The planar star coupler of claim 28, wherein said means for aligning comprises screw holes through one of said plates and threaded screw holes embedded in said other plate, such that a screw through said screw holes is captured in said threaded screw hole.

30. The planar star coupler of claim 28, further comprising means disposed in said second plate opposite said grooves for enabling securement of fibers located in said grooves.

31. The planar star coupler of claim 30, wherein said means for enabling securement comprises a plurality of threaded holes disposed so that a screw through a threaded hole will secure a fiber located in an associated groove.

32. The planar star coupler of claim 28, wherein said first plate and said second plate are molded plastic.

33. The planar star coupler of claim 28, where said waveguide plate is molded polymer.

34. The planar star coupler of claim 28, where said waveguide plate has a metallic layer on its edges.

35. The planar star coupler of claim 28, wherein said top surface of said first plate includes means for facilitating removal of said waveguide plate.

36. The planar star coupler of claim 35, wherein said means for facilitating removal comprises at least one notch provided in said first plate adjacent to said aperture in said first plate.

37. The planar star coupler of claim 28, wherein adjacent grooves are separated by angular spacing $\Delta\theta$, where $0° \leq \Delta\theta \leq \sin^{-1}$ (NA), where NA is the numerical aperture of fibers to be located in said grooves.

38. The planar star coupler claim 28, wherein said means for aligning comprises spring clips and receptacles molded in said first plate and said second plate.

39. The planar star coupler of claim 28, wherein said means for aligning comprises a barbed pin and a mating receptacle.

40. The planar star coupler of claim 28, wherein said first plate and said second plate are disks, said aperture is circular, and said grooves extend radially from said aperture.

41. The planar star coupler of claim 28, wherein said first edge and said second edge are the same edge.

42. The planar star coupler of claim 28, further comprising means for suspending said waveguide plate in said air pocket.

43. The planar star coupler of claim 42, wherein said means for suspending comprises an air pocket liner having two steps, such that the air pocket liner include a top portion and a bottom portion smaller in dimension than said top portion, whereby the waveguide plate is supported by said bottom portion of said air pocket liner and suspended in said air pocket.

44. The planar star coupler of claim 28, wherein the waveguide plate is removable from said aperture in said first plate.

45. An optical network of polymer optical fibers including a planar star coupler comprising:

a first plate having a top surface with an aperture disposed therein;

a first set of grooves disposed in the top surface of said first plate extending from said aperture to a first edge of the top surface;

a second set of grooves disposed in the top surface of said first plate extending from the said aperture to a second edge of the top surface;

a waveguide plate dimensioned to fit into said aperture in said first plate;

a second plate having an aperture therein located so that when said second plate is in juxtaposition with said first plate, said aperture in said first plate aligns with said aperture in said second plate to form an air pocket, such that top and bottom surfaces of said waveguide plate are suspended in said air pocket;

means for aligning and securing said first plate, said waveguide plate and said second plate in alignment;

a first set of input polymer optical fibers disposed in said first set of grooves;

a second set of output polymer fibers disposed in said second set of grooves; and securing means for securing said first and said second set of polymer fibers in respective said first and said second set of grooves.

46. The optical network of claim 45, wherein said first plate and second plate are molded plastic.

47. The optical network of claim 45, wherein said waveguide plate is molded polymer.

48. The optical network of claim 45, wherein adjacent grooves are separated by angular spacing, $\Delta\theta$, where $0° \leq \Delta\theta \leq \sin^{-1}$ (NA), where NA is the numerical aperture of said fibers.

49. The optical network of claim 45, wherein said first edge and said second edge are the same edge.

50. The optical network of claim 45, wherein said first plate and said second plate are disks, said aperture is circular, and grooves extend radially from said aperture to the circumference of said disk.

51. The optical network of claim 45, wherein said securing means comprises a clamp.

52. The optical network of claim 45, wherein the waveguide plate is removable from said aperture in said first plate.

* * * * *